United States Patent Office 2,717,890
Patented Sept. 13, 1955

2,717,890

TALLOIL SEPARATION BY UREA EXTRACTION

Erhart K. Drechsel, Springdale, Conn., assignor to American Cyanamid Company, New York, N. Y., a corporation of Maine No Drawing. Application July 27, 1951,
Serial No. 239,027

1 Claim. (Cl. 260—96.5)

This invention relates to a process for separating the unsaponifiable materials present in talloil from the fatty acid fraction contained therein by mixing the talloil with a concentrated aqueous solution of urea until a fatty acid-urea complex is formed, filtering off the crystalline complex and leeching out the urea from the crystalline complex by treating the same with water, thereafter recovering the fatty acid fraction which is substantially completely free of any unsaponifiable material. Still further, this invention relates to a process as outlined above in which the talloil is dispersed in an inert organic solvent, i. e., unreactive with talloil and/or urea. Still further, this invention relates to a process as outlined above, in which the mixing of the talloil or talloil solution in an inert organic solvent with the saturated urea aqueous solution is accomplished at temperatures between 1–30° C. Still further, this invention relates to a process of separating the unsaponifiable materials from the fatty acid fractions of talloil substantially as indicated hereinabove, wherein the filtrate developed from the first crystalline complex extraction is treated with a second saturated aqueous solution of urea to form a second crystalline urea fatty acid complex, which second crystalline complex is separated from the solvent and is treated with water so as to remove substantially all of the urea present in the complex recovering the organic layer consisting essentially of fatty acids and combining said fatty acid fraction with the first fatty acid fraction developed, or any part thereof, wherein said combination of fatty acid fractions is substantially completely free of any unsaponifiable materials.

The principal object of the present inventon is to remove the unsaponifiable materials present in talloil from the fatty acid fraction of talloil by treating said oil with a saturated aqueous solution of urea until a crystalline complex develops, removing said complex from its liquid media by filtration and leeching out the urea portion of the complex by treating same with water.

A further object of the present invention is to separate the unsaponifiable materials present in talloil from the fatty acid fraction thereof by treating an inert organic solvent solution of talloil with a substantially saturated aqueous solution of urea until a crystalline complex develops filtering off the complex and treating the filtrate with a second substantially saturated aqueous solution of urea until a second complex develops, leeching out the urea from both the first and second complexes separately or in combination until the fatty acid fraction or fractions is separated from the dilute aqueous urea solution.

These and other objects of the present invention will be discussed more fully hereinbelow.

Talloil is a by product of the sulfate treatment of wood pulp and is generally available commercially in substantial quantities. Talloil contains many useful materials, outstanding amongst which are certain saturated and unsaturated fatty acids such as oleic acid, linoleic acid and linolenic acid. These fatty acids are useful in many fields of application and are particularly useful as modifiers in surface coating compositions such as alkyd resin compositions. The use of talloil per se has had but limited acceptance for use in surface coating compositions, primarily because of the presence of the unsaponifiable materials contained therein. These unsaponifiable materials constitute only a comparatively minor portion of the total composition of talloils generally, in the order of magnitude of about 6–8% as an average maximum for crude talloil and lesser percentages in the order of magnitude of about 2% for refined talloil and distilled talloil. Notwithstanding the rather insignificant amount of unsaponifiables present, it is, nevertheless, these materials which are the prime reason for objection to use of talloil in surface coating compositions. Coating compositions modified with talloil instead of conventional drying oils such as semi-drying and drying oils or the fatty acids derived therefrom having a tendency to remain tacky even after prolonged periods of air-drying or baking of the films. This one factor alone obviously makes talloil modified alkyds as a general rule undesirable and commercially useless.

Crude talloil generally contains about 44.8% of fatty acids, from 46–49% rosin acids and about 8% unsaponifiables. Acintol D (the distillate produced from distilling crude talloil once) contains the following: about 66.2% fatty acids, 32% rosin acids and 1.8% unsaponifiables. Acintol FA 2 (the distillate produced by distilling Acintol D twice) contains about 97.1% fatty acids, about 1% rosin acids and about 1.9% unsaponifiables.

It can be clearly seen from this, although it is possible to remove a substantial portion of the rosin acids from crude talloil by a plurality of distillations, the amount of unsaponifiables remains substantially constant even though the percentage of unsaponifiables present in the finally distilled produce is diminished, it would appear, then, that even a great plurality of distillation steps does not suffice to separate these unsaponifiables from the talloil crude or the distilled talloil.

The rosin acids present in talloil are largely diterpene acids of the formula $C_{19}H_{29}COOH$ in various stages of isomerization of which the principal acids are abeitic acid, neoabeitic acid, levopimaric acid, d-pimaric acid, 7-iso-d-pimaric acid and dehydroabeitic acid. The presence of these rosin acids in talloil does not materially affect the ultimate desirable characteristics of surface coating materials such as modified alkyd resins in any way near the way the unsaponifiables materials affect the characteristics of said surfacing coating materials but it is to be noted that, in the distillation of crude talloil, it is the fatty acids which are removed with the bulk of the unsaponifiables, whereas the rosin acids tend to remain. This is due to the lower boiling points of the fatty acids generally, in comparison to the higher boiling points of rosin acids present in the talloil crude. Fractional distillation, then, can be used to remove a very substantial part of the fatty acids present, but fractional distillation does not appear to be satisfactory in separating the fatty acids of talloil from the undesirable unsaponifiables. I have discovered that I can remove the unsaponifiable materials from the talloil both crude and distilled by subjecting the talloil to treatment with a concentrated aqueous solution of urea, wherein said solution is substantially saturated, saturated or even supersaturated. Obviously, it would be preferred to use as starting materials, the refined talloil such as the distilled talloil referred to hereinabove but it is possible, nevertheless, to practice my process on crude talloil. Still further, it is possible for me to treat the talloil, either crude or refined, directly with the urea solution without benefit of any dispersing solvent for the talloil but it is preferred that one use an inert organic solvent for the talloil inasmuch as the process is then accomplished more expeditiously. My process can be practiced at room temperature, that is, at temperatures of about 25–30° C., but if one wishes, one may use temperatures as low as 1° C., but preferably between 10 and 25° C. In order that the concept of the present invention may be more completely understood, the following examples are set forth solely for the purpose of illustration in which all parts are parts by weight. It should be remembered that specific enumeration of detail is by way of illustration only and should not be interpreted as limitations on the case except as indicated by the appended claims.

*Example 1*

250 parts of Acintol D dissolved in 250 parts of methyl isobutyl ketone are treated with 655 parts of water containing 790 parts of urea. The talloil solution is added fairly rapidly to the previously prepared saturated solution of urea at 25° C. The crystalline complex begins to separate out almost immediately accompanied by a slightly exotherm to 30° C. The mixture is stirred thoroughly and after about 2–3 hours, the temperature has dropped back to about 25° C. and the crystalline complex is separated from the slurry by means of filtration. To separate the complex from the slurry, one could use in substitution a centrifuge operation. The crystals are then washed with a small amount of methyl isobutyl ketone and sucked dry to remove excess solvent. The crystalline complex is then added to excess water at 60 to 80° C., wherein the urea is dissolved and the fatty acid separated therefrom. The acids are then thoroughly washed to remove the urea, and the methyl isobutyl ketone, which remained, is taken off by means of a water aspirator (under an absolute vacuum of 150 millimeters down to 15 millimeters) and steam bath temperatures up to 85° C. The final traces of solvent are removed with an oil pump at an absolute vacuum down to about 0.5 millimeter, where it is held for about 30 minutes at 85° C. This remaining fraction consists essentially of recovered fatty acids and amounted to about 92 parts. The filtrate and the methyl isobutyl ketone washings (from the complex filtration) were combined, the organic layer separated therefrom and washed thoroughly with fresh water. The organic layer may be treated again with a concentrated or saturated urea solution in order to separate still further more of the fatty acid fraction still remaining from the unsaponifiable materials.

The following chart serves to illustrate further the results produced in Example 1 and some of the physical characteristics of the end products as contrasted with the starting materials of Example 1.

| Product | Recovery | | Color | Iodine Value | Acid Value | Sap. Value | Percent Unsap. |
|---|---|---|---|---|---|---|---|
| | Parts | Percent | | | | | |
| Initial | 250 | 100 | 11− | 186 | 188 | 190 | 5.56 |
| Extract | 92 | 36.8 | 7+ | 109 | 198 | 203 | 0.71 |
| Residue | 148 | 59.2 | 14+ | 209 | 179 | 181 | 9.11 |
| Loss | 10 | 4.0 | | | | | |

*Example 2*

1200 parts of Acintol #2 dissolved in 1200 parts of methyl isobutyl ketone are added to 3200 parts of water containing 3920 parts of urea dissolved therein. The process is accomplished substantially in keeping with that set forth in Example 1 and the first fatty acid fraction extracted is 441 parts. The organic layer recovered after the washings of the filtrate amounts to 707 parts of which 650 parts are taken and redissolved in an equal proportion of methyl isobutyl ketone and this organic solution is then added rapidly to 3025 parts of water containing 3675 parts of urea. Again the mixture is thoroughly stirred for 2–3 hours at a temperature of about 25° C. and when the crystalline complex is substantially completely formed, it is separated from the slurry by means of filtration and the complex is again treated as before by adding an excess of water thereto at temperatures of about 60–80° C. until substantially all of the urea is dissolved therefrom, whereupon the acids are removed and dried as in Example 1. The second extract amounts to about 422 parts and gives a total of 863 parts of fatty acids recovered from the original charge of refined talloil fatty acids which are substantially completely free from any unsaponifiable materials.

The following chart serves to illustrate further the results produced in Example 2 and some of the physical characteristics of the end products as contrasted with the starting materials of Example 2.

| Product | Recovery | | Color Initial | +Heat | Iodine Value | Acid Value | Sap. Value | Unsap., Percent |
|---|---|---|---|---|---|---|---|---|
| | Parts | Percent | | | | | | |
| Initial | 1,200 | 100 | 7 | 11 | 134 | 194 | 197 | 4.05 |
| 1st Extract | 441 | 36.8 | | | 97 | 193 | 197 | 0.68 |
| 1st Residue | 707 | 58.9 | 10− | | 151 | 190 | 196 | 6.00 |
| Loss | 52 | 4.3 | | | | | | |

| Product | Recovery | | Color Initial | +Heat | Iodine Value | Acid Value | Sap. Value | Percent Unsap. |
|---|---|---|---|---|---|---|---|---|
| | g. | Percent | | | | | | |
| 1st Raffinate | 650 | 100 | | | | | | |
| 2nd Extract | 422 | 64.9 | 9+ | 15 | 138 | 195 | 194 | 0.92 |
| 2nd Residue | 180 | 27.7 | 17+ | | 179 | 172 | 181 | 17.1 |
| Loss | 48 | 7.4 | | | | | | |

When it is desired to make a total extraction of the fatty acids from the talloil in a one step operation so as to remove the unsaponifiable materials therefrom, it is desirable to use a large excess of urea. Since the saturated fatty acids tends to form the complex before the unsaturated fatty acids and since the less unsaturated fatty acids tend to form a complex before the more unsaturated fatty acids, the use of the one step extraction tends to produce an unfavorable saturated to unsaturated acid ratio and any extraction which would not completely remove substantially all of the fatty acid fractions would simply render this ratio still more unfavorable since the lineoleic and linolenic acids form complexes least readily and would be extracted last. The fatty acid mixture extracted would, as a consequence, have a lower iodine value if substantially all of the unsaturated acids are not removed, than such a mixture would have if all of the fatty acdis are removed. It is, then, desirable to increase the iodine value of the mixture of fatty acids to a higher value because such mixtures find greater application in the preparation of surface coating materials. If one were to extract the fatty acids from a refined talloil in a one step operation, one might find that a part of the fatty acids were left behind in the filtrate and that the extracted fatty acids had an iodine value of about 120—130. This would indicate that the polyunsaturated acids such as linolenic were lost in the course of extraction. By making the extraction in 2 steps, one is able to obtain substantially all of the polyunsaturated acids from the tall-oil and the ultimate mixture of fatty acids will have an average iodine number in the order of magnitude of about 150 or more which value is exceedingly desirable in fatty acids, particularly for use in surface coating materials.

It has been stated hereinabove that the present process can be practiced on talloil without benefit of a solvent for the talloil. However, it is preferred that a solvent be used. This is in order to reduce the viscosity of the talloil so that the mixing with the aqueous urea solution can be accomplished more readily and so that the maximum amount of crystalline complex may be produced. As solvents, one may use a great variety of materials, preferably inert organic solvents which may be either miscible, partly immiscible, or completely immiscible with water. Specifically, as solvents, one may use aliphatic alcohols, both monohydric and polyhydric such as methyl alcohol, ethyl alcohol, propyl alcohol, butyl alcohol, ethylene glycol, glycerol, diethylene glycol and the like. Still further, one may use aliphatic ketones such as acetone, methyl ethyl ketone, diethyl ketone, and the like or one may use certain of the aliphatic alkyl esters such as ethyl acetate, butyl acetate, butyl propionate, and the like. Still further, if one wishes, one may make use of the hydrocarbon solvents, both aliphatic and aromatic, such as xylol, naphtha and certain petroleum hydrocarbon fractions such as Varsol No. 1, Varsol No. II, P-1 ink oil, Solvesso No. 100, Solvasol, No. 80 White Oil and the like. It is obviously necessary that the solvent selected be one which is normally liquid at the temperatures at which the process is accomplished, namely between 1 and about 30° C.

It has been further discovered that although the fatty acids derived from the talloil by the present process have very desirable color properties initially, they lose this desirable property on heating to temperatures in the order of magnitude of about 200–250 which is the usual temperature at which alkyd preparation is accomplished. As a consequence, these urea treated acids when used in alkyd preparation gave discolored products. For many applications, this is not an undesirable defect as color in many instances is not of prime importance and is overcome by the use of darker pigments. However, when the surface coating materials are to be used in light colors such as pastels, whites and clears, partially discolored products are seriously defective. The cause for this discoloration probably resides in the fact that small traces of urea, that is, about 0.1% will cause this discoloration. Factual evidence seems to establish this belief because untreated fatty acids will become markedly discolored on heating when a trace of urea is added to the fatty acids before heating. The applicant has found that after he has made his fatty acid extraction and has removed substantially all of the urea that can be removed by the aqueous washing steps, that if he subjects the fatty acids to steam distillation under acid condition, he is able to remove practically all traces of the urea remaining so that the resultant acid mixture has good color and good color stability even at temperatures as high as 260° C. To illustrate this part of the applicant's concept, the following example is set forth in which all parts are parts by weight. As before, these examples are set forth solely for the purpose of illustration and should not be interpreted as limitations on the case except as indicated in the appended claim.

*Example 3*

250 parts of Acintol FA #2 are dissolved in 250 parts of methyl isobutyl ketone and the solution is treated with 655 parts of water containing 790 parts of urea. This treatment is accomplished by adding the talloil solution to the previously prepared saturated solution of urea at a fairly rapid rate at 25° C. The procedure is continued as in Example 1 hereinabove until the fatty acid fraction, (containing some solvent, i. e. methyl isobutyl ketone and traces of urea) amounting to about 130 parts are removed. To this 130 parts, there is added approximately 100 parts of 3.0 N hydrochloric acid and the mixture steam distilled to remove substantially all traces of solvent and destroy substantially all traces of urea. The steam distillation step is followed by an additional washing to remove ammonium salts such as ammonium chloride and is finally dried under 0.5 mm. of pressure at 85° C. The products obtained were light in color and had good color stability even at 260° C. Furthermore, the characteristic woody odor present in all talloil samples appeared to be much more completely removed. The initial color of the fatty acids thus derived was 5— and after heating at 260° C. for 10 minutes, the color was 7. The color of the second extract from Example 2 was initially 9 and after heating for 10 minutes at 260° C. was 15.

The following chart serves to illustrate further the results produced in Example 3 and some of the physical characteristics of the end products as contrasted with the starting materials of Example 3.

| Product | Recovery | | Color Initial | Heat |
|---|---|---|---|---|
| | g. | Percent | | |
| Initial | 250 | | | |
| Extract | 130 | 52.0 | 5— | 7 |
| Residue | 105 | 42.0 | 9–10 | 11— |
| Loss | 15 | 6.0 | | |

*Example 4*

A solution of 4520 parts of urea in 3730 parts of water is prepared. To this urea solution is added rather rapidly at 25° C. a solution of 1250 parts of Acintol FA #2 dissolved in 1250 parts of methyl isobutyl ketone. The procedure set forth in Example 1 is followed fairly substantially except that the initial crystalline slurry is cooled to about 10° C., before centrifugation. The ratio of extract to residue obtained is much larger (2:1). This was due primarily to the lower temperature used during the centrifuge operation and further due to the use of a finer, more closely woven filter cloth. The crystalline complex is then added to excess water at 60–80° C. in substantially the same manner as that set forth in Ex. 1 whereupon the fatty acid fraction is separated therefrom, thoroughly washed to remove urea and is then steam distilled under acid conditions in order to remove substantially all traces of the solvent and destroy substantially all traces of urea, resulting in a fatty acid fraction of improved color and improved color stability. Some of the results of Example 4 are set forth in the chart hereinbelow.

| Product | Recovery | | Color Initial | Heat | Iodine Value | Acid Value | Sap. Value | Percent Unsap. Ultraviolet |
|---|---|---|---|---|---|---|---|---|
| | g. | Percent | | | | | | |
| Initial | 1,250 | 100.0 | | | | | | |
| Extract | 765 | 61.2 | | | | 104 | 198 | 204 | 0.24 |
| Residue | 390 | 31.2 | 10–11 | 11–12 | 5+ | 165 | 182 | 185 | 9.5 |
| Loss | 95 | 7.6 | | | | | | | |

In one particular part of the present process, namely in the step of washing the fatty acid layer free of urea, the constant stirring or shaking used to accomplish excess washing may tend to emulsify the organic and aqueous layers. In such an event, it may well be desired to add to the mixture a de-emulsifying agent such as sodium sulfate which will inhibit a stable emulsion formation. Obviously, other de-emulsifying agents may be used in the place of the sodium sulfate and further enumeration of these agents is deemed unnecessary as they are well known in the art.

I claim:

In a process for separating unsaponifiables from the fatty acid fraction of talloil, comprising mixing talloil with a concentrated aqueous solution of urea until a crystalline complex of urea and fatty acids separates out, filtering off the complex and washing said complex with water to remove substantially all of the urea from the complex and recovering therefrom the fatty acid fraction substantially completely free of unsaponifiable materials, the step comprising steam distilling said fatty acid fraction under acid condition in order to remove substantially all traces of urea, thereby improving the color and color stability of the fatty acid fraction.

References Cited in the file of this patent

UNITED STATES PATENTS

| | | |
|---|---|---|
| 2,267,269 | Cheetham et al. | Dec. 23, 1941 |
| 2,395,284 | Lovas | Feb. 19, 1946 |
| 2,432,332 | Palmer | Dec. 9, 1947 |
| 2,596,344 | Newey et al. | May 13, 1952 |

OTHER REFERENCES

Bengen et al.: Experimentia, vol. 5 (part 5), page 200 (May 15, 1949).